United States Patent
Lorenz et al.

(10) Patent No.: US 10,503,709 B2
(45) Date of Patent: Dec. 10, 2019

(54) DATA CONTENT IDENTIFICATION

(71) Applicants: Ben Lorenz, La Crosse, WI (US);
Sophie Beutler, La Crosse, WI (US)

(72) Inventors: Ben Lorenz, La Crosse, WI (US);
Sophie Beutler, La Crosse, WI (US)

(73) Assignee: SAP SE, Walldorf (DE)

( * ) Notice: Subject to any disclaimer, the term of this patent is extended or adjusted under 35 U.S.C. 154(b) by 582 days.

(21) Appl. No.: 14/204,187

(22) Filed: Mar. 11, 2014

(65) Prior Publication Data

US 2015/0261772 A1    Sep. 17, 2015

(51) Int. Cl.
*G06F 16/215*    (2019.01)

(52) U.S. Cl.
CPC ................................ *G06F 16/215* (2019.01)

(58) Field of Classification Search
CPC .. G06F 11/1435; G06F 16/2365; G06F 16/93; G06F 17/245; G06F 17/246; G06Q 10/0639; Y10S 707/99953; G06K 19/06037
USPC .......................... 707/791, 793, 701, 723, 748
See application file for complete search history.

(56) References Cited

U.S. PATENT DOCUMENTS

| | | | | |
|---|---|---|---|---|
| 5,608,898 A * | 3/1997 | Turpin | ...................... | G06F 8/34 |
| 5,701,400 A * | 12/1997 | Amado | ...................... | G06N 5/02 |
| | | | | 706/45 |
| 7,383,237 B2 * | 6/2008 | Zhang | ...................... | G06K 9/623 |
| | | | | 706/20 |
| 7,702,636 B1 * | 4/2010 | Sholtis | ............... | G06F 17/30566 |
| | | | | 707/999.1 |
| 7,720,846 B1 * | 5/2010 | Bayliss | ............. | G06F 17/30598 |
| | | | | 707/736 |
| 8,311,960 B1 * | 11/2012 | Ginzburg | ............. | G06N 99/005 |
| | | | | 706/13 |
| 8,666,998 B2 * | 3/2014 | Nelke | ...................... | G06F 17/10 |
| | | | | 707/749 |
| 9,317,189 B1 * | 4/2016 | Chen | ...................... | G06F 3/0484 |
| 2002/0101932 A1 * | 8/2002 | Montgomery | .......... | H03M 7/30 |
| | | | | 375/240.25 |
| 2004/0061702 A1 * | 4/2004 | Kincaid | ................ | G06T 11/206 |
| | | | | 345/440 |
| 2004/0181526 A1 * | 9/2004 | Burdick | ............ | G06F 17/30598 |
| 2006/0282429 A1 * | 12/2006 | Hernandez-Sherrington | .............. | |
| | | | | G06F 17/30604 |

(Continued)

*Primary Examiner* — Tony Mahmoudi
*Assistant Examiner* — Linh Black
(74) *Attorney, Agent, or Firm* — Mintz Levin Cohn Ferris Glovsky and Popeo, P.C.

(57) ABSTRACT

The subject matter disclosed herein provides methods for identifying the type of content found in a database or source file having data records. A source file having one or more data records may be accessed. The data records may be associated with one or more data values arranged into columns. One or more data types may be proposed for at least one column by examining the data values in the column. A confidence score may be calculated for each proposed data type. The proposed data types may be arranged into a prioritized list based on each data type's confidence score. One or more rules may be applied to the column to finalize priorities of the proposed data types. The rules may be applied without referring to the data values in the column. Results may be provided based on the finalized priorities. Related apparatus, systems, techniques, and articles are also described.

10 Claims, 4 Drawing Sheets

(56) References Cited

U.S. PATENT DOCUMENTS

| | | | |
|---|---|---|---|
| 2010/0161602 A1* | 6/2010 | Caceres | G06F 17/30539 707/736 |
| 2011/0055172 A1* | 3/2011 | Tan | G06F 17/30241 707/692 |
| 2012/0023107 A1* | 1/2012 | Nachnani | G06F 17/30303 707/748 |
| 2012/0047090 A1* | 2/2012 | Gunther | G06Q 40/06 705/36 R |
| 2012/0054180 A1* | 3/2012 | Priyadarshan | G06F 17/30528 707/731 |
| 2013/0091084 A1* | 4/2013 | Lee | G06N 5/02 706/46 |
| 2013/0166583 A1* | 6/2013 | Robinson | H04L 43/18 707/758 |
| 2013/0232142 A1* | 9/2013 | Nielsen | H04H 60/45 707/736 |
| 2014/0168517 A1* | 6/2014 | Petajan | G06F 17/30038 348/576 |
| 2014/0222793 A1* | 8/2014 | Sadkin | G06F 17/3053 707/723 |
| 2014/0337358 A1* | 11/2014 | Mitra | G06F 17/30289 707/748 |
| 2015/0006491 A1* | 1/2015 | He | G06F 17/30575 707/694 |
| 2015/0032609 A1* | 1/2015 | Abuelsaad | G06F 17/30303 705/40 |
| 2015/0052601 A1* | 2/2015 | White | H04L 63/1416 726/13 |
| 2015/0067553 A1* | 3/2015 | Grieve | G06F 3/0484 715/765 |

* cited by examiner

| | Given Name | Unknown | Unknown | Unknown | Street | City | Unknown | Zip Code | Country | Unknown | Unknown |
|---|---|---|---|---|---|---|---|---|---|---|---|
| 205 | Alan | | Crawford | 123 Consulting | 4567 Main St. | | TN | 37013 | USA | 615-325-3957 | acrawford@123consulting.com |
| 210 | Sally | W | Sue | Casting Experts | | Los Angeles | CA | 90012 | USA | 552-54-4456 | ssue@castingexperts.com |
| 215 | Beverly | C | Davis | | 2416 x St. | Tallahassee | FL | 32301 | USA | 635-55-1586 | bdavis@cable.com |
| 220 | Gene | D | Goody | First Bank of Ohio | | Cleveland | OH | 44109 | USA | 1-513-895-3856 | ggoody@firstbank.com |

FIG. 2

| | Given Name | Unknown | Family Name | Unknown | Street | City | Unknown | Zip Code | Country | Phone Number | E-Mail Address |
|---|---|---|---|---|---|---|---|---|---|---|---|
| 205 | Alan | | Crawford | 123 Consulting | 4567 Main St. | | TN | 37013 | USA | 615-325-3957 | acrawford@123consulting.com |
| 210 | Sally | W | Sue | Casting Experts | | Los Angeles | CA | 90012 | USA | 552-54-4456 | ssue@castingexperts.com |
| 215 | Beverly | C | Davis | | 2416 K St. | Tallahassee | FL | 32301 | USA | 635-55-1986 | bdavis@cable.com |
| 220 | Gene | | Goody | First Bank of Ohio | | Cleveland | OH | 44109 | USA | 1-513-895-3850 | ggoody@firstbank.com |

FIG. 3

DATA CONTENT IDENTIFICATION

TECHNICAL FIELD

This disclosure relates generally to the identification of the type of content found in a database or a source file having one or more data records.

BACKGROUND

Businesses of every size manipulate large amounts of data records every day. These data records include important information for day-to-day operations including, for example, customer accounts, employee information, marketing campaigns, and the like. Before the information in these data records may be used for analysis or reporting purposes, it may be necessary to determine the type of content associated with these data records. Determining the content type may be difficult if the data steward tasked with these duties is unfamiliar with the structure of the data records or is unaware of any nuances in the data records. Because the number of data records may be voluminous, manual identification of the content type may be impractical. This difficulty may be exacerbated in cases where the data records are incorrectly entered or misfielded with an incorrect data type either by manual or automated means. In these situations, extra processing may be needed for data quality clean-up in order to account for these misfielded data types.

SUMMARY

In some implementations, methods and apparatus, including computer program products, are provided for identifying the type of data associated with data values in a database or a source file.

In one aspect, a source file having one or more data records is accessed. The one or more data records are associated with one or more data values arranged into one or more columns. One or more data types are proposed for at least one column by at least examining the one or more data values in the at least one column. The proposing includes calculating a confidence score for each proposed data type. The one or more proposed data types are arranged into a prioritized list based on the confidence score of each data type. One or more rules are applied to the at least one column to finalize priorities of the one or more proposed data types. The one or more rules are applied without referring to the one or more data values in the at least one column. One or more results are provided based on the finalized priorities.

The above methods, apparatus, and computer program products may, in some implementations, further include one or more of the following features.

The providing may include assigning a data type to the at least one column.

The proposing may include examining the one or more data values in the at least one column based on at least one of the following: a match between a format of the one or more data values with one or more patterns, and a match between the one or more data values with one or more entries in one or more data directories.

The confidence score may be based on at least one of the following: a first percentage of data values in the at least one column having a format that matches the one or more patterns, and a second percentage of data values in the at least one column that match the one or more entries in the one or more data directories.

A data type may be assigned to the at least one column if a confidence score of the assigned data type is greater than a threshold value. The assigned data type may be selected from the one or more proposed data types.

The one or more rules may include a comparison of the one or more proposed data types for the at least one column with one or more data types of all other columns in the source file.

The one or more rules may include one or more proximity rules that finalize the priorities of the one or more proposed data types based on a data type of one or more nearby columns.

The one or more proximity rules may include a first proximity rule that examines one or more name components associated with the one or more nearby columns. The one or more name components may include a given name, a middle initial, or a family name.

The one or more proximity rules may include a second proximity rule that examines one or more address components associated with the one or more nearby columns. The one or more address components may include a street, a city, a state, a country, or a zip code.

The one or more nearby columns may be adjacent to the at least one column.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 2 illustrates a table of sample data records that may be used by the content identification application during the first stage of analysis, in accordance with some example implementations;

FIG. 3 illustrates a table of sample data records that may be used by the content identification application during the second stage of analysis, in accordance with some example implementations.

Like reference symbols in the various drawings indicate like elements.

DETAILED DESCRIPTION

This application discloses techniques for identifying the type of content found in a database or source file having one or more data records. Unlike conventional applications which may require a user to manually assign a data type or category to a data value, the content identification application disclosed herein automates the process using a multi-stage analysis.

Figure 1:
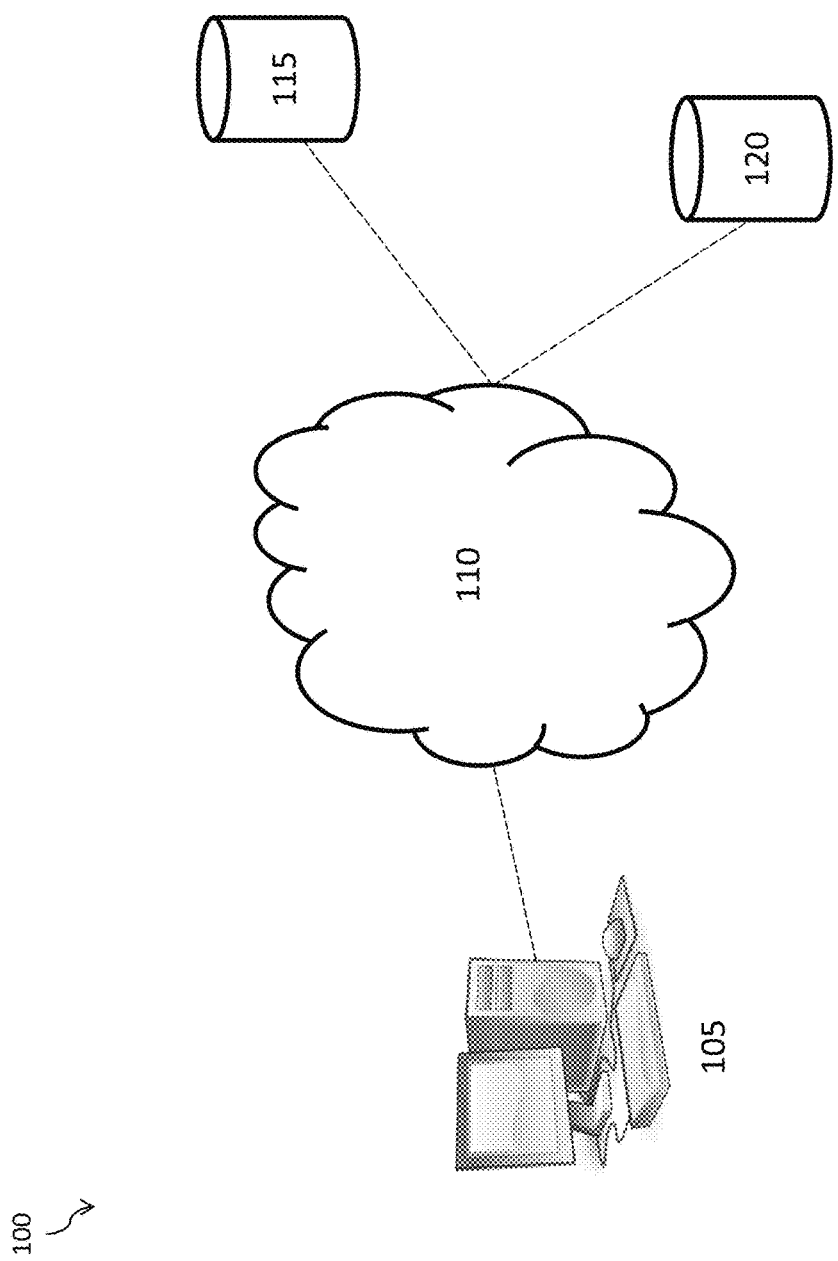
FIG. 1 illustrates a system for using a content identification application, in accordance with some example implementations.

FIG. 1 illustrates an exemplary system 100 for using the content identification application. System 100 may include a computing device 105, such as a computer or a laptop, operated by a data steward. The data steward may be responsible for collecting, consolidating, and analyzing data records from databases 115 and 120. Databases 115 and 120 may store different types of data including, for example, data records related to a firm's customer relationship management (CRM) system or human capital management (HCM) system. In some implementations, these databases may be remotely accessed via network 110. Databases 115 and 120 may send one or more source files containing data records to computer 105. These source files may be sent on a regular basis (e.g., weekly reports) or upon request from computing device 105. The data steward can run a content identification application on computing device 105 to identify the type of data in the source files.

FIG. 2 illustrates a table 200 of sample data records from an exemplary source file received from databases 115 or 120. The content identification application may use table 200 during the first stage of analysis. Each of data records 205-220 may be associated with a person and may have one or more data values representing different attributes of the person. These data values may be arranged into columns 230-280, and each column may be associated with a particular attribute or data type. For example, column 230 may hold data values for a given name data type, and column 250 may hold data values for a street data type. These data types may be included in the received source file. While several columns in table 200 may already be associated with a data type, others may not (e.g., columns 235, 240, 245, 260, 275, and 280). Computing device 105 may run a content identification application to propose one or more data types for this latter set of columns. Because data types in the source file may be mislabeled or too ambiguous to reliably determine the contents of the columns, the content identification application may perform the following analyses on pre-populated data types as well.

The content identification application may analyze the data records in table 200 in at least two stages. In the first stage of analysis, the content identification application may propose all possible data types for the data values in columns 230-280. As a result, there may be cases where multiple data types are proposed for a single column. For example, the word "Madison" may have multiple meanings. It may, for example, refer to a city (e.g., Madison, Wis.), a street address (e.g., 123. Madison Street), a person's given name (e.g., Madison Jones), a person's family name (e.g., James Madison), or a word within a firm's name (e.g., Madison Insurance Company). Consequently, the content identification application may identify multiple data types (city, street address, given name, family name, and firm name) based on this data value. In some cases, the data values may be so ambiguous that the content identification application is unable to propose any data types. In order to refine these ambiguous results, the content identification application may apply various context based rules during the second stage of analysis. Both stages of analysis are described below.

First Stage of Analysis

The content identification application may begin the first stage of analysis as soon as computing device 105 receives a source file from databases 115 or 120. As explained above, this source file may include one or more data values arranged into one or more columns. During the first stage, the content identification application may examine these data values on a column-by-column basis and, based on this examination, propose possible data types for each column. The content identification application may utilize pattern matching techniques and various data directories during the examination process.

Pattern matching techniques take advantage of the fact that certain types of data generally follow a specific format. For example, an e-mail address generally follows a "user name@domain name" pattern. In another example, a social security number generally follows a "xxx-yy-zzzz" pattern (i.e., a three digit number that is followed by a two digit number that, in turn, is followed by a four digit number). In yet another example, a phone number, such as a phone number in the United States, generally follows an "aaa-bbb-cccc" pattern (i.e., a three digit number that is followed by a three digit number that, in turn, is followed by a four digit number). In some implementations, this pattern may be preceded by the addition of optional digits (such as the number "1"). During the examination of a particular column, the content identification application may compare the format of the data values in the column with a list of known patterns. These known patterns may include one or more optional numbers as described above. In some implementations, the content identification application may be configured to recognize patterns associated with international phone numbers as well. The list of known patterns may be stored locally at computing device 105 or at a remote location that is accessible via network 110. If a match is found, then the content identification application may propose the matching format as a possible data type.

For example, referring to column 275 of table 200, the content identification application may find data values for data records 205, 210, 215, and 220. The data value in data record 205 may include a string of numbers that follows a three digit-three digit-four digit format. The data value in data record 220 may include a string of numbers that follows a one digit-three digit-three digit-four digit format. The content identification application may compare the format of these data values to a known list of patterns and, in the process, determine that both formats match a phone number pattern. For example, the content identification application may determine that the data value in data record 205 matches a known three digit-three digit-four digit pattern, and that the data value in data record 220 matches the same pattern with an optional leading digit (i.e., the number "1"). Accordingly, the content identification application may propose a phone number data type for column 275. The data values in data records 210 and 215, however, may have a completely different format. The content identification application may determine that these data records have a three digit-two digit-four digit format that matches a social security number pattern. Accordingly, the content identification application may also propose a social security number data type for column 275 as well.

The content identification application may rank or prioritize these proposed data types by calculating a confidence score for each proposal. The confidence score may be calculated by determining the percentage of data values in a column having the proposed data type. For example, with regard to the data values of column 275, two of the four data records are formatted as phone numbers. As such, the confidence score for a phone number data type with respect to column 275 may be 50%. Likewise, because two of the four data records are formatted as social security numbers, the confidence score for a social security number data type with respect to column 275 may also be 50%. The content identification application may generate a prioritized list of data types using these confidence scores. With regard to the data values in column 275, this list may include two proposed data types (i.e., a phone number and social security number), and each data type may have the same priority.

A similar analysis may be performed on column 280. As the content identification application examines the data values in column 280, the application may determine that the data values in data records 205, 210, 215, and 220 have an e-mail address format. Consequently, the content identification application may propose an e-mail address data type for this column. Because all of the data values in column 280 follow this pattern, the confidence score for this data type in this column may be 100%.

As described above, the content identification application may propose one or more data types for a column. In some implementations, the content identification application may assign a proposed data type to a column if its confidence score exceeds a threshold value. This threshold value may be a predetermined value set by an administrator. The user of the content identification application may not have access to view or modify this threshold value. For example, if the threshold value is set at 80%, then the content identification application may assign an e-mail data type to column 280 because its confidence score (100%) exceeds the threshold value.

In addition to pattern matching, the content identification application may also use data directories during the examination process. These data directories may include, for example, a list of common given names, common family names, registered company or firm names, streets, cities, states, countries, and the like. These data directories may be stored locally at computing device 105 or at a remote location that is accessible via network 110. As the content identification application examines the data values in a particular column, it may determine whether any of these data values matches an entry in a data directory. The content identification application may propose a data type based on the data directory in which a match is found.

For example, column 240 of table 200 may include data values for data records 205, 210, 215, and 220. During the examination process, the content identification application may compare these data values to entries in the directories described above. In doing so, the content identification application may determine that the data value for data record 210 ("Sue") matches an entry in the directory of given names. Accordingly, the content identification application may propose a given name data type for column 240. In addition, the content identification application may find matching entries for the data values in data records 205 ("Crawford"), 215 ("Davis"), and 220 ("Goody") in the directory of family names. Accordingly, the content identification application may also propose a family name data type for column 240.

In order to rank or prioritize these proposed data types, the content identification application may calculate a confidence score for each of these proposed data types. For example, because only one of the four data values in column 240 has a given name data type, the confidence score for this data type with respect to this column may be 25%. Likewise, because three of the four data values in column 240 have a family name data type, the confidence score for this data type with respect to this column may be 75%. Because neither data type has a confidence level greater than the 80% threshold value described above, neither data type may be assigned to column 240. The content identification application may subsequently arrange these proposed data types into a prioritized list based on their respective confidence scores. With regard to column 240, this list may include a family name data type and a given name data type. With regard to priorities, the family name data type may have a higher priority than the given name data type in view of their respective confidence scores.

For certain data types, the content identification application may perform additional analysis to provide more precise information about the data values in a column. This additional analysis may apply to names and dates.

For example, if a person's full name is represented within the field of a single data value (rather than spread across multiple data values), then the content identification application may be configured to determine the order of the first name, middle name, and last name. In doing so, the content identification application may refer to data directories of common given names and common family names as described above to determine name order. The content identification application may also consider naming conventions used in different parts of the world. For example, in the Americas, Europe, the Middle East, and Africa, a person's given name may precede the family name. This order, however, may be reversed in China and Japan such that the family name precedes a person's given name.

This additional analysis may also be performed on dates. If, for example, a date is represented within the field of a single data value (rather than spread across multiple data values), then the content identification application may be configured to determine the format of the date. Various formats may be used including, for example, a month-day-year format, a day-month-year format, a year-month-day format, and the like. The content identification application may discern the correct format based on an examination of the data values. For example, a data value of "2012/1/30" may have a known year-month-date format. Data values having an unknown format, such as "1/1/1" may be eliminated from consideration.

After applying one or more of the techniques described above to the columns of table 200, the content identification application may generate a prioritized list of possible data types for each column. As mentioned above, this list may contain multiple proposed data types for a particular column. In some situations, however, the content identification application may be unable to propose any data types. For example, column 235 may have data values consisting of a single letter for each of data records 205 ("I"), 210 ("W"), 215 ("C"), and 220 ("I"). During the examination of these data values, the content identification application may determine that none of these data values matches a particular pattern or an entry in a data directory and, consequently, that there may be no suitable data type for column 235. The content identification application may refine these ambiguous results during the second stage of analysis.

Second Stage of Analysis

The content identification application may use context based rules to resolve ambiguous results from the first stage. Ambiguous results may appear if the content identification application is unable to propose any data type for a column in a source file. When this occurs, the prioritized list generated during the first stage may be empty. Ambiguous results may also appear if the content identification application proposes multiple data types for a column in a source file. In this scenario, the prioritized list may include two or more data types. As explained above, these ambiguous results may appear based on an examination of the data values.

During the second stage of analysis, the content identification application may ignore the data values in the source file and, instead, focus on the relationships between columns to resolve the ambiguity. In doing so, the content identification application may finalize the priorities of the data types in the prioritized list by shifting their priorities with respect to each other. The content identification application may subsequently propose and assign the data type having the highest priority to the column.

FIG. 3 illustrates a table 300 that may be used with these context based rules. Table 300 may have the same data records 205-220 and many of the same columns 230, 235, and 245-270 as table 200. However, the data types for columns 340 ("Family Name"), 375 ("Phone Number"), and 380 ("E-Mail Address") may be different from the data types for columns 240 ("Unknown"), 275 ("Unknown"), and 280 ("Unknown").

In an implementation, the content identification application may use a proximity analysis to resolve any ambiguous results from the first stage. In a proximity analysis, the content identification application may use data type information from nearby columns to determine the data type of the column in question.

For example, as described above with respect to FIG. 2, the single letter data values in column 235 may be ambiguous. In order to resolve this ambiguity, the content identification application may look at the data types of nearby columns 230 and 340 and use this information to propose a data type for column 235. In the example of FIG. 2, nearby columns 230 and 340 may be adjacent to column 235. In some implementations, nearby columns may include a set of non-adjacent columns and all intervening columns. This set of nearby columns may be located two columns away, three columns away, and the like. The distance between nearby columns may be set by an administrator. The user of the content identification application may not have access to view or modify this parameter.

Referring to table 300, nearby column 230 may have a given name data type, and nearby column 340 may have a family name data type. These data types may correspond to different components of a name. Name components may include, for example, a given name, a middle initial, a family name, and the like. Given the proximity of column 235 to columns 230 and 340, the content identification application may determine that the data type for column 235 may also be a name component. Because the given name and family name data types are already being used, the content identification application may determine based on the process of elimination that the data values of column 235 are middle initials.

This determination may impact the priorities of the proposed data types in the prioritized list for column 235. If the prioritized list already includes an entry for the selected data type (i.e., the middle initial data type), then the content identification application may increase the priority of this entry. If, however, the selected data type is absent from the prioritized list, then the content identification application may add an entry for this data type. Based on these adjustments, the content identification application may then assign the data type having the highest priority to column 235.

The proximity analysis described above may also be used with address components. Address components may include, for example, a street, a city, a state, a zip code, a country, and the like. If, for example, the content identification application finds a column of data values that include numbers but cannot discern the column's data type, the application may look at the data types of nearby columns. If these nearby data types are address components as well, then the data type for the column of numbers may also be an address component (e.g., a zip code).

Context based rules may also resolve situations in which two or more data types are proposed for a column. Column 260 may, for example, at the end of the first stage be associated with two data types—states and countries. This determination may be based on an examination of the data values in data records 205 and 210. With regard to the former, the data value "TN" may represent a state (i.e., Tennessee) or a country (e.g., Tunisia). The same may be true for the "CA" data value as well (i.e., CA may refer to California or Canada). At the end of the first stage, the content identification application may add the state and country data types to a prioritized list of data types for column 260.

In order to resolve the ambiguity associated with having two proposed data types, the content identification application may compare the proposed data types in the prioritized list (i.e., state and country) to all of the assigned data types in the source file. In doing so, the content identification application may determine whether any of the proposed data types are already assigned to a column in the source file. If so, then the content identification application may determine by process of elimination which of the proposed data types should be selected.

For example, as illustrated in table 300, the country data type may already be assigned to column 270. As such, the data type of column 260 may not also be a country. This determination may impact the priorities of the state and country data types in the priority list for column 260. Specifically, the content identification application may adjust the priorities of these data types such that the state data type has a higher priority than the country data type. The content identification application may make this adjustment by increasing the priority of the state data type, decreasing the priority of the country data type, or both. After this adjustment is made, the content identification application may assign the data type having the highest priority to column 260.

Figure 4:
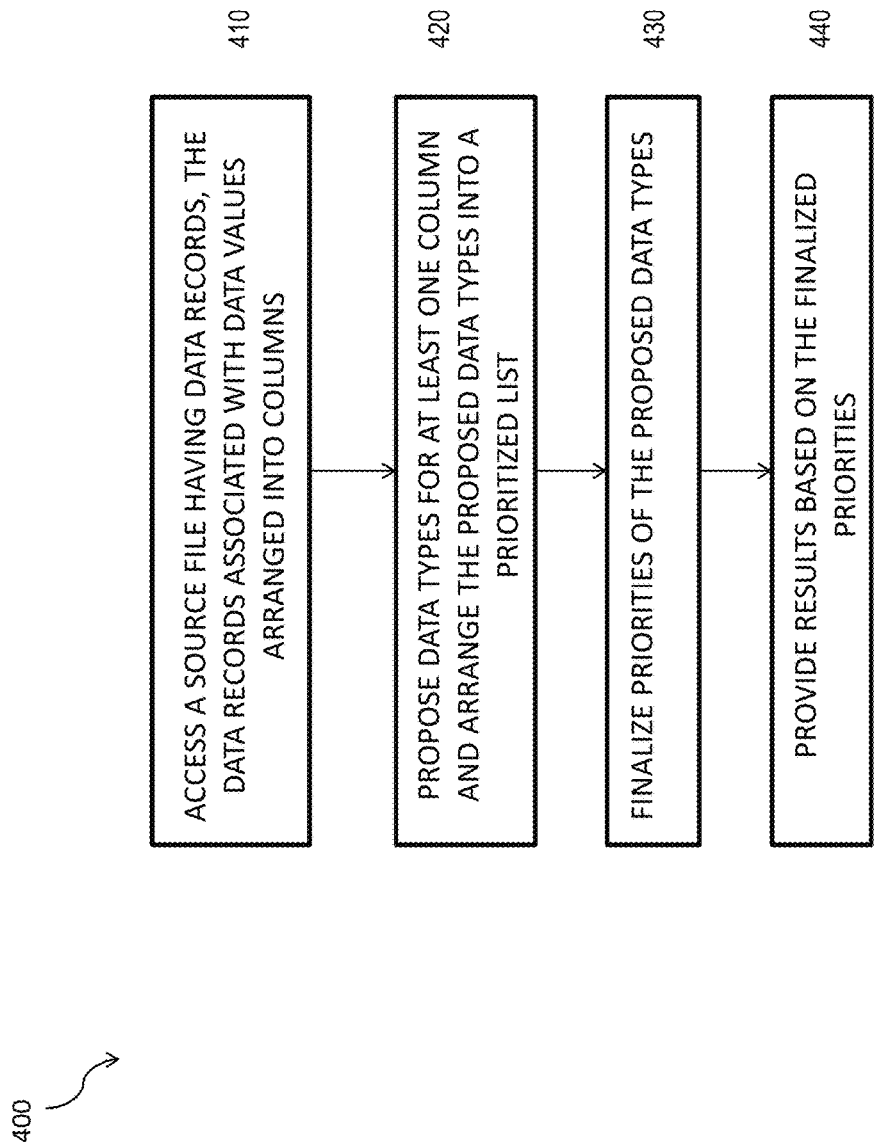
FIG. 4 illustrates a process for identifying the type of content in a source file, in accordance with some example implementations.

FIG. 4 illustrates a flowchart for identifying the type of content in a source file.

At 410, the content identification application can access a source file. The source file may have one or more data records. These data records may be associated with one or more data values that are arranged into one or more columns.

At 420, the content identification application may propose one or more data types for at least one column. This proposal may be based on an examination of the data values in the column. During the examination, the content identification application may use pattern matching techniques or data directory look-ups to determine the column's data type as described above with respect to FIG. 2. In some implementations, the content identification application may calculate a confidence score for each data type and arrange the proposed data types into a prioritized list. This confidence score may correspond to a priority for the data type, and the prioritized list may be prioritized or sorted based on the confidence level of the proposed data types.

At 430, the content identification application may finalize priorities of the proposed data types by applying one or more rules. These rules may include the context based rules described above with respect to FIG. 3. During this process, the content identification application may not examine the underlying data values in the column under inspection.

At 440, the content identification application may provide results based on the finalized priorities. The providing of results may include the assigning of a data type to a column.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A method comprising:
   accessing a source file having one or more data records, the one or more data records associated with one or more data values arranged into at least one column having an unknown data type, the unknown data type including a mislabeled data type; and
   proposing one or more data types for the at least one column having the unknown data type by at least:
      examining the one or more data values in the at least one column, the examining including examining, based on pattern matching, the one or more data values in the at least one column and examining, based on data directory matching, the one or more data values with one or more entries in at least one data directory, wherein the examining the one or more data values in the at least one column is based on at least a match between a format of the one or more data values with one or more patterns and/or a match between the one or more data values with one or more entries in the at least one data directory,
      calculating, for the at least one column, one or more confidence scores as one or more percentages indicating, based on pattern matching and the data directory matching, how many of the one or more data values in the at least one column match and/or the at least one data directory match, wherein the one or more confidence scores are based on a first percentage of data values in the at least one column having a format that matches the one or more patterns and/or a second percentage of data values in the at least one column that match the one or more entries in the at least one data directory,
      in response to the one or more confidence scores being over a threshold score, assigning the one or more proposed data types for the at least one column, wherein the one or more confidence scores prioritize the one or more proposed data types for the at least one column,
      in response to the one or more confidence scores being below the threshold score, applying one or more context rules to the at least one column to determine, based on a neighboring data type contained in a neighboring column proximate to the at least one column, the one or more proposed data types, and
      in response to the one or more confidence scores being below the threshold score, assigning, based on the applying of the context rules, the determined one or more proposed data types for the at least one column, wherein the one or more proposed data types have been adjusted, due to the applied one or more context rules, one or more confidence scores and corresponding priorities, wherein the accessing and the proposing are performed by at least one processor.

2. The method of claim 1, wherein the assigned data type is selected from the one or more proposed data types, and wherein the assigning is performed by at least one processor.

3. The method of claim 1, wherein the one or more context rules comprise a comparison of the one or more proposed data types for the at least one column with one or more data types of all other columns in the source file.

4. The method of claim 3, wherein the one or more context rules comprise a first proximity rule that examines one or more name components associated with the neighboring column, and wherein the one or more name components comprise a given name, a middle initial, or a family name.

5. The method of claim 1, wherein the one or more context rules comprise a second proximity rule that examines one or more address components associated with the neighboring column, and wherein the one or more address components comprise a street, a city, a state, a country, or a zip code.

6. The method of claim 1, wherein the neighboring column is adjacent to the at least one column.

7. A non-transitory computer-readable medium containing instructions to configure at least one processor to perform operations comprising:

accessing a source file having one or more data records, the one or more data records associated with one or more data values arranged into at least one column having an unknown data type, the unknown data type including a mislabeled data type; and proposing one or more data types for the at least one column having the unknown data type by at least:

examining the one or more data values in the at least one column, the examining including examining, based on pattern matching, the one or more data values in the at least one column and examining, based on data directory matching, the one or more data values with one or more entries in at least one data directory, wherein the examining the one or more data values in the at least one column is based on at least a match between a format of the one or more data values with one or more patterns and/or a match between the one or more data values with one or more entries in the at least one data directory, calculating, for the at least one column, one or more confidence scores as one or more percentages indicating, based on pattern matching and the data directory matching, how many of the one or more data values in the at least one column match and/or the at least one data directory match, wherein the one or more confidence scores are based on a first percentage of data values in the at least one column having a format that matches the one or more patterns and/or a second percentage of data values in the at least one column that match the one or more entries in the at least one data directory, in response to the one or more confidence scores being over a threshold score, assigning the one or more proposed data types for the at least one column, wherein the one or more confidence scores prioritize the one or more proposed data types for the at least one column, in response to the one or more confidence scores being below the threshold score, applying one or more context rules to the at least one column to determine, based on a neighboring data type contained in a neighboring column proximate to the at least one column, the one or more proposed data types, and in response to the one or more confidence scores being below the threshold score, assigning, based on the applying of the context rules, the determined one or more proposed data types for the at least one column, wherein the one or more proposed data types have been adjusted, due to the applied one or more context rules, one or more confidence scores and corresponding priorities, wherein the accessing and the proposing are performed by at least one processor.

8. The non-transitory computer-readable medium of claim 7, wherein the one or more context rules comprise a comparison of the one or more proposed data types for the at least one column with one or more data types of all other columns in the source file.

9. A system comprising:

at least one processor; and at least one memory, wherein the at least one processor and the at least one memory are configured to perform operations comprising:

accessing a source file having one or more data records, the one or more data records associated with one or more data values arranged into at least one column having an unknown data type, the unknown data type including a mislabeled data type; and proposing one or more data types for the at least one column having the unknown data type, the proposed one or more data types determined via a two-stage analysis comprising:

a first-stage analysis comprising:

examining the one or more data values in the at least one column, the examining including examining, based on pattern matching, the one or more data values in the at least one column and examining, based on data directory matching, the one or more data values with one or more entries in at least one data directory, wherein the examining the one or more data values in the at least one column is based on at least a match between a format of the one or more data values with one or more patterns and/or a match between the one or more data values with one or more entries in the at least one data directory, calculating, for the at least one column, one or more confidence scores as one or more percentages indicating, based on pattern matching and the data directory matching, how many of the one or more data values in the at least one column match and/or the at least one data directory match, wherein the one or more confidence scores are based on a first percentage of data values in the at least one column having a format that matches the one or more patterns and/or a second percentage of data values in the at least one column that match the one or more entries in the at least one data directory, and in response to the one or more confidence scores being over a threshold score, assigning the one or more proposed data types for the at least one column, wherein the one or more confidence scores prioritize the one or more proposed data types for the at least one column, and a second-stage comprising:
- in response to the one or more confidence scores being below the threshold score, applying one or more context rules to the at least one column to determine, based on a neighboring data type contained in a neighboring column proximate to the at least one column, the one or more proposed data types, and
- in response to the one or more confidence scores being below the threshold score, assigning, based on the applying of the context rules, the determined one or more proposed data types for the at least one column, wherein the one or more proposed data types have been adjusted, due to the applied one or more context rules, one or more confidence scores and corresponding priorities.

10. The system of claim 9, wherein the one or more context rules comprise a comparison of the one or more proposed data types for the at least one column with one or more data types of all other columns in the source file.

* * * * *